United States Patent
Gingade et al.

(10) Patent No.: US 12,488,734 B2
(45) Date of Patent: Dec. 2, 2025

(54) CONTEXTUAL CONSERVATION OF ENERGY IN RUNNING APPLICATIONS

(71) Applicant: INTERNATIONAL BUSINESS MACHINES CORPORATION, Armonk, NY (US)

(72) Inventors: Sunil Gingade, Channagiri (IN); Hemant Kumar Sivaswamy, Bangalore (IN); Bhanu Prathap Velampati, Bangalore (IN); Hariharan Krishna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/405,008

(22) Filed: Jan. 5, 2024

(65) Prior Publication Data

US 2025/0225914 A1    Jul. 10, 2025

(51) Int. Cl.
*G09G 3/32* (2016.01)
*G06F 3/01* (2006.01)

(52) U.S. Cl.
CPC .............. *G09G 3/32* (2013.01); *G06F 3/013* (2013.01); *G09G 2320/0686* (2013.01); *G09G 2330/023* (2013.01); *G09G 2354/00* (2013.01)

(58) Field of Classification Search
CPC ........... G09G 3/001; G09G 3/20–2007; G09G 3/32–3291; G09G 2320/06; G09G 2320/0613; G09G 2320/062; G09G 2320/066–0686; G09G 2320/10–106; G09G 2330/023; G09G 2354/00; G06F 3/002; G06F 3/005; G06F 3/011–013; G06F 3/0481; G06F 3/04815;
(Continued)

(56) References Cited

U.S. PATENT DOCUMENTS 9,436,269 B2    9/2016  Yang
11,564,171 B2   1/2023  Ahn
(Continued)

FOREIGN PATENT DOCUMENTS

CN    1963909 A     5/2007
EP    3862845 A1    8/2021

OTHER PUBLICATIONS

Disclosed Anonymously, "Determining Optimal Dimming of Displays", IPCOM000252351D, Jan. 5, 2018, 39 Pages.
(Continued)

*Primary Examiner* — Nathan Danielsen
(74) *Attorney, Agent, or Firm* — Robert R. Aragona

(57) ABSTRACT

An embodiment for contextually conserving energy in running applications is provided. The embodiment may include receiving display content and real-time data from one or more sources on a device of a user. The embodiment may also include identifying a context of one or more running applications on a display of the device. The embodiment may further include dividing the display of the device into a grid. The embodiment may also include identifying one or more active portions of the display. The embodiment may further include in response to determining at least one portion of the display is inactive, performing an energy reduction action to the at least one inactive portion of the display.

14 Claims, 3 Drawing Sheets

(58) Field of Classification Search
CPC ....... G06F 3/04845; G06F 2203/04801; G06F 2203/04803; G02B 27/01; G02B 2027/0138; G02B 2027/0141; G02B 2027/0179; G02B 2027/0187
See application file for complete search history.

(56) References Cited

U.S. PATENT DOCUMENTS

| | | | |
|---|---|---|---|
| 2006/0227125 A1* | 10/2006 | Wong | G09G 5/14 345/211 |
| 2006/0271612 A1* | 11/2006 | Ritter | G09G 3/002 375/E7.161 |
| 2007/0146344 A1* | 6/2007 | Martin | G09G 5/00 345/173 |
| 2017/0278484 A1 | 9/2017 | Chen | |
| 2018/0261003 A1* | 9/2018 | Peli | G06F 3/013 |
| 2021/0181827 A1 | 6/2021 | Zou | |
| 2023/0316634 A1* | 10/2023 | Chiu | G06F 3/017 345/156 |

OTHER PUBLICATIONS

Disclosed Anonymously, "Method and System for Controlling the Backlight of a Display Device through Software", IPCOM000197403D, Jul. 7, 2010, 3 Pages.

Disclosed Anonymously, "Method to reduce power consumption on mobile device using segmented display backlighting", IPCOM000229413D, Jul. 28, 2013, 3 Pages.

Disclosed Anonymously, "Save power of a LED display device by using only part of the screen", IPCOM000249136D, Feb. 8, 2017, 4 Pages.

Sharma, "Townhall of IBM Sustainability Software 2023", https://w3.ibm.com/w3publisher/sustainability-software-lab/ssw-blogs/blog/d6455450-fca3-11ed-b4ef-c7fc032119c1, May 28, 2023, 5 Pages.

USPTO, "Class 345, Computer Graphics Processing and lective Visual Display Systems", https://www.uspto.gov/web/patents/classification/shadowFiles/defs345sf.htm?345_426&S&1&2&8#8, Accessed Jan. 3, 2024, 1 Page.

USPTO, "Classification Resources", https://www.uspto.gov/web/patents/classification/uspc345/sched345.htm, Accessed on Jan. 3, 2024, 20 Pages.

Wendt, "IBM LinuxONE: Reduce energy consumption and build sustainable infrastructure", https://w3.ibm.com/w3publisher/we-are-ibm-technology-emea/blog/592a67c0-2de7-11ed-99de-012cb442431a, Sep. 5, 2022, 3 Pages.

Classification Resources, "Computer Graphics Proceeding and Selective Visual Display Systems", Apr. 11, 2025, 19 pages, https://www.uspto.gov/web/patents/classification/uspc345/sched345.htm.

Huang Carmen, "How can the led display be energy-saving?", Jun. 23, 2020, 05 pages, https://inmoled.com/services/.

Jiang Julia, "7 ways to reduce the LED display power comsumption", Aug. 8, 2022, 08 pages, https://www.linkedin.com/pulse/7-ways-reduce-led-display-power-comsumption-julia-jiang.

Led Yuchip, "How To Reduce My LED Screen Power Consumption?", Jan. 10, 2025, 16 pages, https://www.yuchip-led.com/reduce-led-screen-power-consumption/.

Shriver Brett, "4 Ways to Reduce Power without Sacrificing LED Brightness", Nov. 26, 2022, 03 pages, https://web.archive.org/web/20230128043902/https://www.glthome.com/reduce-power-without-sacrificing-led-brightness/.

\* cited by examiner

CONTEXTUAL CONSERVATION OF ENERGY IN RUNNING APPLICATIONS

BACKGROUND

The present invention relates generally to the field of computing, and more particularly to a system for contextually conserving energy in running applications.

Use of LED-based display devices have been on the rise in recent years. These LED-based display devices may include several consumer products, such as televisions, smart phones, tablets, and laptops. LED-based display devices are commonly divided into multiple types, such as OLED and P-OLED. In OLED and P-OLED, the individually lit pixels may brighten, dim, or turn on and off completely, enabling a crystal clear picture.

SUMMARY

According to one embodiment, a method, computer system, and computer program product for contextually conserving energy in running applications is provided. The embodiment may include receiving display content and real-time data from one or more sources on a device of a user. The embodiment may also include identifying a context of one or more running applications on a display of the device based on the display content and the real-time data. The embodiment may further include dividing the display of the device into a grid. The embodiment may also include identifying one or more active portions of the display based on the context. The embodiment may further include in response to determining at least one portion of the display is inactive based on the one or more active portions, performing an energy reduction action to the at least one inactive portion of the display.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
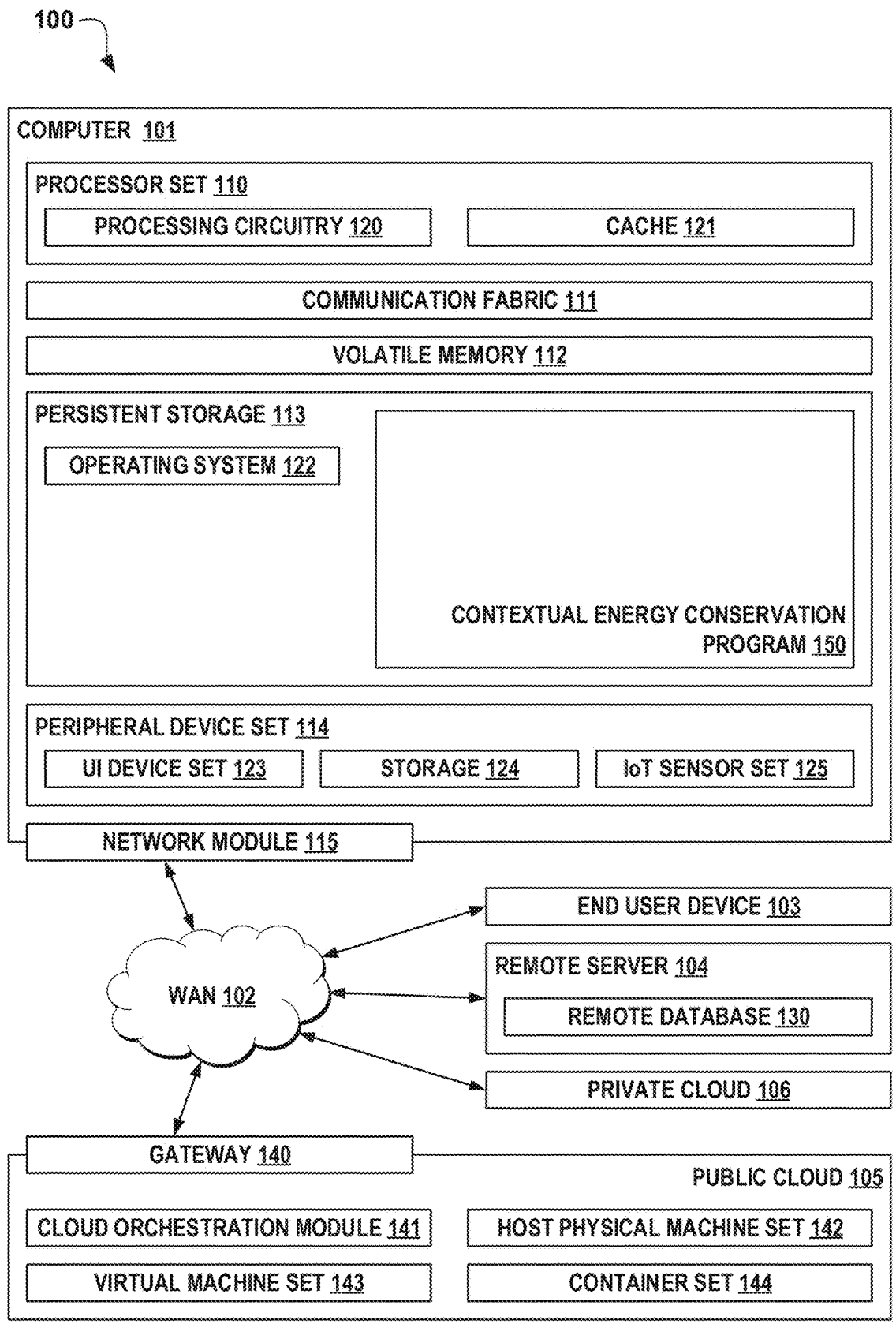
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for contextually conserving energy in running applications. The following described exemplary embodiments provide a system, method, and program product to, among other things, determine whether at least one portion of a display is inactive and, accordingly, in response to determining the at least one portion of the display is inactive, performing an energy reduction action to the at least one inactive portion of the display. Therefore, the present embodiment has the capacity to improve energy conservation technology by dynamically reducing the energy consumption of LED-based displays without powering down the LED-based displays.

As previously described, use of LED-based display devices have been on the rise in recent years. These LED-based display devices may include several consumer products, such as televisions, smart phones, tablets, and laptops. LED-based display devices are commonly divided into multiple types, such as OLED and P-OLED. In OLED and P-OLED, the individually lit pixels may brighten, dim, or turn on and off completely, enabling a crystal clear picture. At present, most of the energy in the LED-based display devices is consumed by the display (i.e., the screen) itself. This problem is typically addressed by placing the screen in power saving mode after a few minutes of inactivity. However, placing the screen in power saving mode fails to selectively disable a portion of the screen that is not in use while applications are running.

It may therefore be imperative to have a system in place to selectively shutdown or disable a portion of the screen that is not in use while applications are running. Thus, embodiments of the present invention may provide advantages including, but not limited to, dynamically reducing the energy consumption of LED-based displays without powering down the LED-based displays, selectively disabling a portion of the screen that is not in use while applications are running, and reducing the time required to reactivate unused functionalities of applications. The present invention does not require that all advantages need to be incorporated into every embodiment of the invention.

According to at least one embodiment, when a user is interacting with an LED-based display, display content and real-time data from one or more sources on a device of the user may be received in order to identify a context of one or more running applications on a display of the device based on the display content and the real-time data. Upon identifying the context of the one or more running applications, the display of the device may be divided into a grid. Then, one or more active portions of the display may be identified based on the context so that it may be determined whether at least one portion of the display is inactive based on the one or more active portions. In response to determining the at least one portion of the display is inactive, an energy reduction action to the at least one inactive portion of the display may be performed. According to at least one embodiment, the energy reduction action may be dimming one or more pixels in the grid corresponding to the at least one inactive portion of the display. According to at least one other embodiment, the energy reduction action may be powering off the one or more pixels in the grid corresponding to the at least one inactive portion of the display.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to determine whether at least one portion of a display is inactive and, accordingly, in response to determining the at least one portion of the display is inactive, performing an energy reduction action to the at least one inactive portion of the display.

Referring to FIG. 1, an exemplary computing environment 100 is depicted, according to at least one embodiment. Computing environment 100 contains an example of an environment for the execution of at least some of the computer code involved in performing the inventive methods, such as a contextual energy conservation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a camera, LED pixels, infrared (IR) sensors, eye movement sensors, and/or light sensors.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the contextual energy conservation program 150 may be a program capable of receiving display content and real-time data from one or more sources on a device of a user, determining whether at least one portion of a display is inactive, performing an energy reduction action to the at least one inactive portion of the display, dynamically reducing the energy consumption of LED-based displays without powering down the LED-based displays, selectively disabling a portion of the display that is not in use while applications are running, and reducing the time required to reactivate unused functionalities of applications. Furthermore, notwithstanding depiction in computer 101, the contextual energy conservation program 150 may be stored in and/or executed by, individually or in any combination, end user device 103, remote server 104, public cloud 105, and private cloud 106. The contextual energy conservation method is explained in further detail below with respect to FIG. 2. It may be appreciated that the examples described below are not intended to be limiting, and that in embodiments of the present invention the parameters used in the examples may be different.

Figure 2:
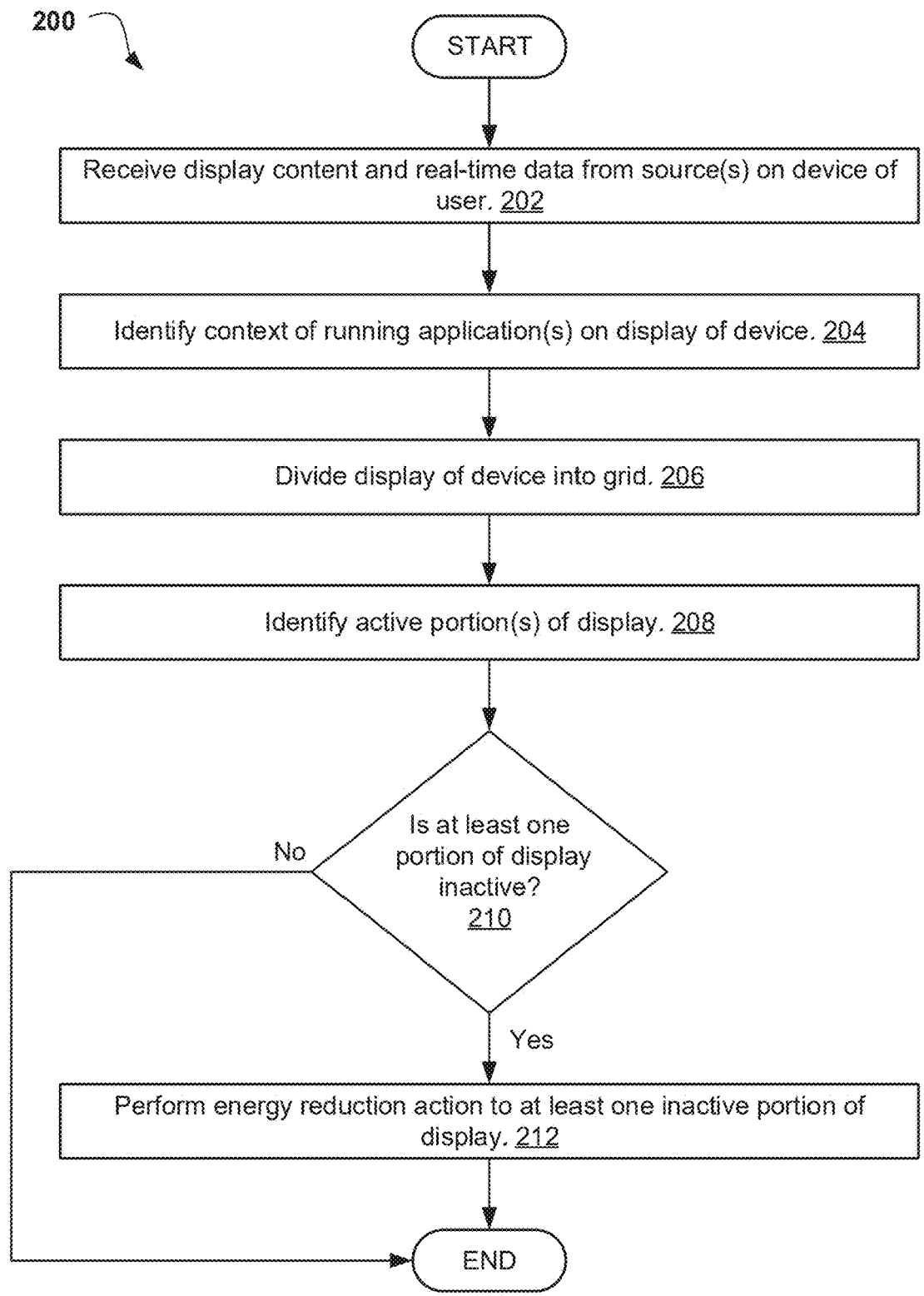
FIG. 2 illustrates an operational flowchart for contextually conserving energy in running applications in a contextual energy conservation process according to at least one embodiment.

Referring now to FIG. 2, an operational flowchart for contextually conserving energy in running applications in a contextual energy conservation process 200 is depicted according to at least one embodiment. At 202, the contextual energy conservation program 150 receives the display content and the real-time data from the one or more sources on the device of the user.

The display content may be the content that is visible to the user on the device. For example, in a word processing application the display content may include a main pane showing text, a top toolbar, a sidebar, and a bottom bar.

Figure 3:
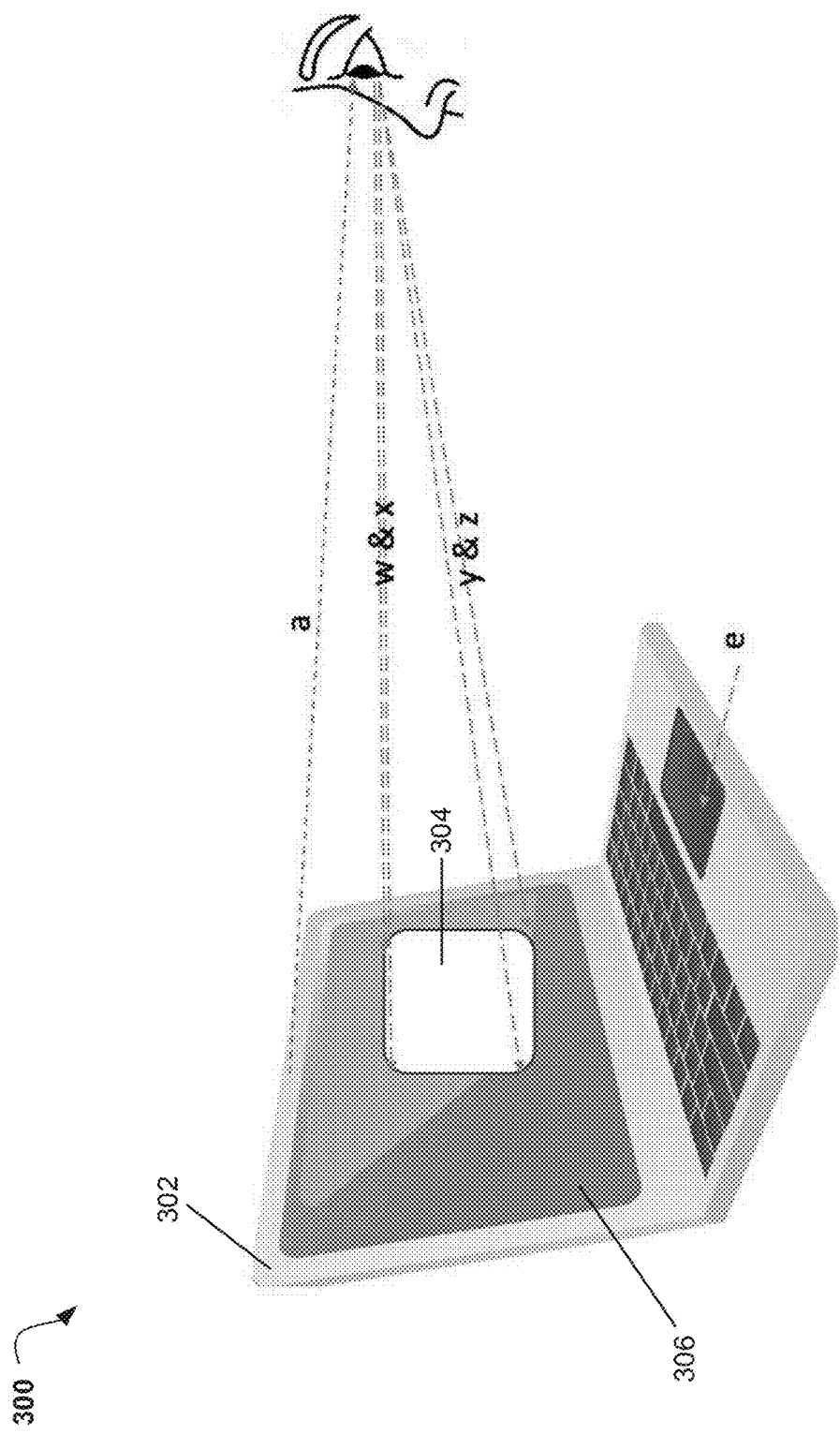
FIG. 3 is an exemplary diagram depicting the tracking of various user movements to detect active and inactive portions of a display according to at least one embodiment.

Examples of the source may include, but are not limited to, a mouse, a trackpad, a camera, LED pixels, IR sensors, eye movement sensors, light sensors, and/or any other device capable of communicating with the device of the user. The real-time data may include, but is not limited to, a state of the LED pixels (e.g., in terms of brightness), cursor movements on the display (e.g., from the mouse and/or trackpad), and/or eye and finger movements of the user with respect to the display. For example, a gaze of the user may be focused on a right-center portion of the display, as illustrated in FIG. 3. In another example, the user may move the cursor with the trackpad and/or mouse to a particular portion of the display.

Then, at 204, the contextual energy conservation program 150 identifies the context of the one or more running applications on the display of the device. The context is identified based on the display content and the real-time data. Examples of the running application may include, but are not limited to, a video application, a collaborative meeting application, a web browser application, and/or a word processing application. The context of the one or more running applications may be one or more functionalities of the one or more running applications. Specifically, identifying the context of the one or more running applications may include identifying one or more functionalities of the one or more running applications that are being interacted with by the user (i.e., the one or more functionalities that are being used by the user). As described above with respect to step 202, the real-time data may include cursor movements on the display and/or eye and finger movements of the user with respect to the display. The cursor movements on the display and the eye and finger movements of the user with respect to the display may be tracked by the contextual energy conservation program 150 to identify which functionalities the user is interacting with.

For example, in a collaborative meeting application, the display content may include a top toolbar, a main pane showing the names of the participants in the meeting, and a bottom toolbar having a mute button, a video button, a raise-hand button, a chat button, and/or a screenshare button. The user may interact with (i.e., use) the bottom toolbar by moving their eyes and/or cursor toward the bottom of the display. In this example, the one or more functionalities the user is interacting with is the bottom toolbar.

In another example, in a video application, the display content may include a main pane showing information about the song playing (e.g., the title, artist, and lyrics), a toolbar beneath the main pane having buttons to pause the audio, mute the audio, skip to the next song, and/or fast forward or rewind the audio, and a sidebar of songs in a queue. The user may interact with the sidebar by moving their eyes and/or cursor toward the of the side of the display to shuffle the songs in the queue. In this example, the one or more functionalities the user is interacting with is the sidebar.

In a further example, in a word processing application, the display content may include a main pane showing text, a top toolbar, a sidebar, a scrollbar, and/or a bottom bar. The user may interact with the top toolbar and the scrollbar to change the font and move downward on the page, respectively. In this example, the one or more functionalities the user is interacting with are the top toolbar and the scrollbar.

Next, at 206, the contextual energy conservation program 150 divides the display of the device into the grid. The grid may be a network of parallel and perpendicular lines forming a rectangular shape. The size of the grid may be directly proportional to the size of the display. For example, a larger display may result in a larger grid size. The LED pixels may be assigned to different portions of the grid. In this manner, the energy reduction action described in further detail below with respect to step 212 may be performed on selected portions of the display rather than the entire display.

Then, at 208, the contextual energy conservation program 150 identifies one or more active portions of the display. The one or more active portions of the display are identified based on the context. As used herein, "active portion" means one or more areas of the display where the user is interacting with the one or more functionalities. According to at least one embodiment, identifying the one or more active portions of the display may include mapping the one or more functionalities the user is interacting with to the one or more active portions of the display. The real-time data and the display content may be fed into an AI module as input in order to map the one or more functionalities the user is interacting with to specific areas of the display.

For example, in a collaborative meeting application, where the user interacts with the bottom toolbar by moving their eyes and/or cursor toward the bottom of the display, the one or more active portions of the display may be the bottom toolbar that is mapped to the bottom portion of the display.

In another example, in a video application, where the user interacts with the sidebar by moving their eyes and/or cursor toward the of the side of the display to shuffle the songs in the queue, the one or more active portions of the display may be the sidebar that is mapped to a side portion of the display.

In a further example, in a word processing application, where the user interacts with the top toolbar and the scrollbar to change the font and move downward on the page, respectively, the one or more active portions of the display may be the top toolbar that is mapped to a top portion of the display, and the scrollbar that is mapped to a side portion of the display.

Next, at 210, the contextual energy conservation program 150 determines whether the at least one portion of the display is inactive. The determination is made based on the one or more active portions. It may be appreciated that in embodiments of the present invention, any portion of the display that is not considered active in step 208 may be deemed inactive.

For example, in a collaborative meeting application, the display content may include a top toolbar, a main pane showing the names of the participants in the meeting, and a bottom toolbar having a mute button, a video button, a raise-hand button, a chat button, and/or a screenshare button. The user may interact with (i.e., use) the bottom toolbar by moving their eyes and/or cursor toward the bottom of the display. In this example, the one or more active portions of the display may be the bottom toolbar, and the at least one inactive portion of the display may be the top toolbar and the main pane showing the names of the participants in the meeting.

In another example, in a video application, the display content may include a main pane showing information about the song playing (e.g., the title, artist, and lyrics), a toolbar beneath the main pane having buttons to pause the audio, mute the audio, skip to the next song, and/or fast forward or rewind the audio, and a sidebar of songs in a queue. The user may interact with the sidebar by moving their eyes and/or cursor toward the of the side of the display to shuffle the songs in the queue. In this example, the one or more active portions of the display may be the sidebar of songs in the queue, and the at least one inactive portion of the display may be the main pane, and the toolbar beneath the main pane.

In a further example, in a word processing application, the display content may include a main pane showing text, a top toolbar, a sidebar, a scrollbar, and/or a bottom bar. The user may interact with the top toolbar and the scrollbar to change the font and move downward on the page, respectively. In this example, the one or more active portions of the display may be the top toolbar and the scrollbar, and the at least one inactive portion of the display may be the main pane showing text, the sidebar, and the bottom bar.

In response to determining the at least one portion of the display is inactive (step 210, "Yes" branch), the contextual energy conservation process 200 proceeds to step 212 to perform the energy reduction action to the at least one inactive portion of the display. In response to determining the at least one portion of the display is not inactive (step 210, "No" branch), the contextual energy conservation process 200 ends.

Then, at 212, the contextual energy conservation program 150 performs the energy reduction action to the at least one inactive portion of the display.

According to at least one embodiment, performing the energy reduction action may include dimming one or more pixels in the grid corresponding to the at least one inactive portion of the display. For example, in a collaborative meeting application, where the at least one inactive portion of the display is the top toolbar and the main pane showing the names of the participants in the meeting, the one or more pixels in the grid corresponding to the main pane and the top toolbar may be dimmed. In this embodiment, in addition to dimming the one or more pixels, the one or more pixels may also be grayed out. In this manner, additional energy savings may be achieved.

According to at least one other embodiment, performing the energy reduction action may also include powering off one or more pixels in the grid corresponding to the at least one inactive portion of the display. For example, in a video application, where the at least one inactive portion of the display is the main pane and the toolbar beneath the main pane, the one or more pixels in the grid corresponding to the main pane and the toolbar beneath the main pane may be powered off.

According to at least one further embodiment, performing the energy reduction action may further include restoring one or more pixels in the grid corresponding to the at least one inactive portion of the display to an original brightness. The one or more pixels may be restored to the original brightness in response to determining there is a change in the context. The context of the one or more running applications may change when the user interacts with one or more different functionalities of the one or more running applications. Thus, the at least one inactive portion of the display may become the one or more active portions of the display, and vice versa. For example, in a word processing application, the at least one inactive portion of the display may be the main pane showing text, the sidebar, and the bottom bar. Continuing the example, when the user interacts with the main pane showing text, the sidebar, and the bottom bar, the one or more pixels in the grid corresponding to the main pane showing text, the sidebar, and the bottom bar may be restored to the original brightness.

Referring now to FIG. 3, an exemplary diagram 300 depicting the tracking of various user movements to detect active 304 and inactive 306 portions of a display is shown according to at least one embodiment. In the diagram 300, the device 302 of the user may be displaying an open application. For example, the device 302 may be a laptop computer. Arrow a illustrates a camera of the device 302 tracking the eye movements of the user. Arrow e illustrates a direction of movement on a trackpad of the device 302. Utilizing the real-time data gathered from arrow a and arrow e, the contextual energy conservation program 150 may identify the active portions 304 of the display and the inactive portions 306 of the display. Arrows w, x, y, and z illustrate the four coordinates of the active portions of the display, with arrows w and x illustrating the upper coordinates on the display and arrows y and z illustrating the lower coordinates on the display. As illustrated in the diagram 300, the one or more pixels in the grid corresponding to the inactive portions 306 may be dimmed or powered off, whereas the one or more pixels in the grid corresponding to the active portions 304 may retain their brightness.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of contextually conserving energy in running applications, the method comprising:
receiving display content and real-time data from one or more sources on a device of a user;
identifying a context of one or more running applications on a display of the device based on the display content and the real-time data, wherein the one or more running applications includes a collaborative meeting application, and wherein the identified context of the collaborative meeting application includes the user interacting with a bottom toolbar of the collaborative meeting application;
dividing the display of the device into a grid;
identifying one or more active portions of the display based on the context, wherein the one or more active portions of the display include at least a first portion of a first running application of the one or more running applications, and wherein the one or more active portions of the display include one or more areas of the display with which the user is interacting, wherein the first portion of the first running application includes the bottom toolbar of the collaborative meeting application;
determining whether at least one portion of the display is inactive based on the one or more active portions, wherein the at least one inactive portion of the display at least includes a second portion of the first running application, wherein the second portion of the first running application includes a top toolbar and a main pane of the collaborative meeting application showing names of participants in the collaborative meeting application; and
in response to determining the at least one portion of the display is inactive, performing an energy reduction action to the at least one inactive portion of the display, wherein performing the energy reduction action further comprises dimming one or more first pixels in the grid corresponding to the at least one inactive portion of the display including the second portion of the first running application including the top toolbar and the main pane of the collaborative meeting application and powering off one or more second pixels in the grid corresponding to at least one other inactive portion of the display outside of the first running application.

2. The computer-based method of claim 1, wherein performing the energy reduction action further comprises:
restoring one or more pixels in the grid corresponding to the at least one inactive portion of the display to an original brightness in response to determining there is a change in the context.

3. The computer-based method of claim 1, wherein identifying the context of the one or more running applications further comprises:
identifying one or more functionalities of the one or more running applications that are being interacted with by the user.

4. The computer-based method of claim 3, wherein identifying the one or more functionalities that are being interacted with by the user further comprises:
tracking cursor movements on the display and eye movements of the user with respect to the display; and
mapping the one or more functionalities to the one or more active portions of the display.

5. The computer-based method of claim 1, wherein the running application is selected from a group consisting of a video application, a collaborative meeting application, a web browser application, and a word processing application.

6. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving display content and real-time data from one or more sources on a device of a user;
identifying a context of one or more running applications on a display of the device based on the display content and the real-time data, wherein the one or more running applications includes a collaborative meeting application, and wherein the identified context of the collaborative meeting application includes the user interacting with a bottom toolbar of the collaborative meeting application;

dividing the display of the device into a grid;
identifying one or more active portions of the display based on the context, wherein the one or more active portions of the display include at least a first portion of a first running application of the one or more running applications, and wherein the one or more active portions of the display include one or more areas of the display with which the user is interacting, wherein the first portion of the first running application includes the bottom toolbar of the collaborative meeting application;
determining whether at least one portion of the display is inactive based on the one or more active portions, wherein the at least one inactive portion of the display at least includes a second portion of the first running application, wherein the second portion of the first running application includes a top toolbar and a main pane of the collaborative meeting application showing names of participants in the collaborative meeting application; and
in response to determining the at least one portion of the display is inactive, performing an energy reduction action to the at least one inactive portion of the display, wherein performing the energy reduction action further comprises dimming one or more first pixels in the grid corresponding to the at least one inactive portion of the display including the second portion of the first running application including the top toolbar and the main pane of the collaborative meeting application and powering off one or more second pixels in the grid corresponding to at least one other inactive portion of the display outside of the first running application.

7. The computer system of claim 6, wherein performing the energy reduction action further comprises:
restoring one or more pixels in the grid corresponding to the at least one inactive portion of the display to an original brightness in response to determining there is a change in the context.

8. The computer system of claim 6, wherein identifying the context of the one or more running applications further comprises:
identifying one or more functionalities of the one or more running applications that are being interacted with by the user.

9. The computer system of claim 8, wherein identifying the one or more functionalities that are being interacted with by the user further comprises:
tracking cursor movements on the display and eye movements of the user with respect to the display; and
mapping the one or more functionalities to the one or more active portions of the display.

10. The computer system of claim 6, wherein the running application is selected from a group consisting of a video application, a collaborative meeting application, a web browser application, and a word processing application.

11. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving display content and real-time data from one or more sources on a device of a user;
identifying a context of one or more running applications on a display of the device based on the display content and the real-time data, wherein the one or more running applications includes a collaborative meeting application, and wherein the identified context of the collaborative meeting application includes the user interacting with a bottom toolbar of the collaborative meeting application;
dividing the display of the device into a grid;
identifying one or more active portions of the display based on the context, wherein the one or more active portions of the display include at least a first portion of a first running application of the one or more running applications, and wherein the one or more active portions of the display include one or more areas of the display with which the user is interacting, wherein the first portion of the first running application includes the bottom toolbar of the collaborative meeting application;
determining whether at least one portion of the display is inactive based on the one or more active portions, wherein the at least one inactive portion of the display at least includes a second portion of the first running application, wherein the second portion of the first running application includes a top toolbar and a main pane of the collaborative meeting application showing names of participants in the collaborative meeting application; and
in response to determining the at least one portion of the display is inactive, performing an energy reduction action to the at least one inactive portion of the display, wherein performing the energy reduction action further comprises dimming one or more first pixels in the grid corresponding to the at least one inactive portion of the display including the second portion of the first running application including the top toolbar and the main pane of the collaborative meeting application and powering off one or more second pixels in the grid corresponding to at least one other inactive portion of the display outside of the first running application.

12. The computer program product of claim 11, wherein performing the energy reduction action further comprises:
restoring one or more pixels in the grid corresponding to the at least one inactive portion of the display to an original brightness in response to determining there is a change in the context.

13. The computer program product of claim 11, wherein identifying the context of the one or more running applications further comprises:
identifying one or more functionalities of the one or more running applications that are being interacted with by the user.

14. The computer program product of claim 13, wherein identifying the one or more functionalities that are being interacted with by the user further comprises:
tracking cursor movements on the display and eye movements of the user with respect to the display; and
mapping the one or more functionalities to the one or more active portions of the display.

* * * * *